Sept. 21, 1965 R. M. DUNN 3,207,395
TRANSPORTING DEVICE
Filed May 14, 1963 2 Sheets-Sheet 1
Fig. 1.
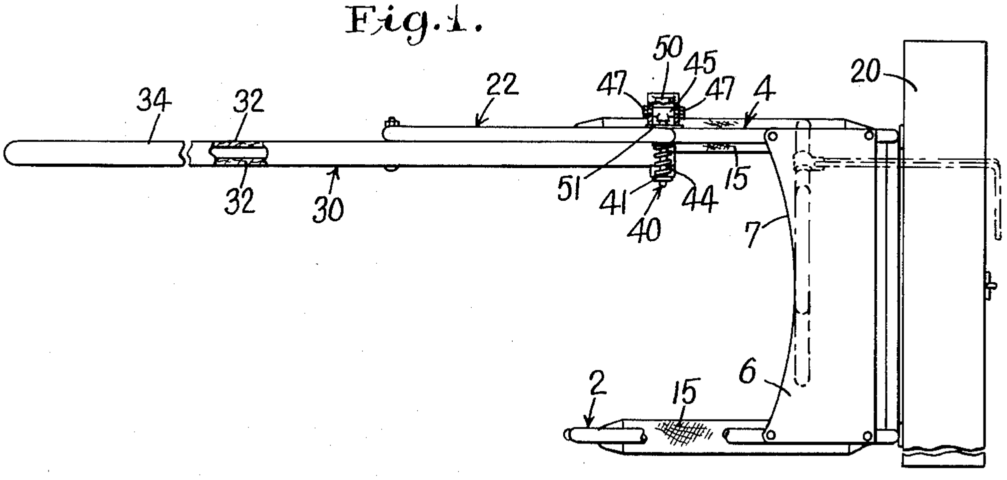
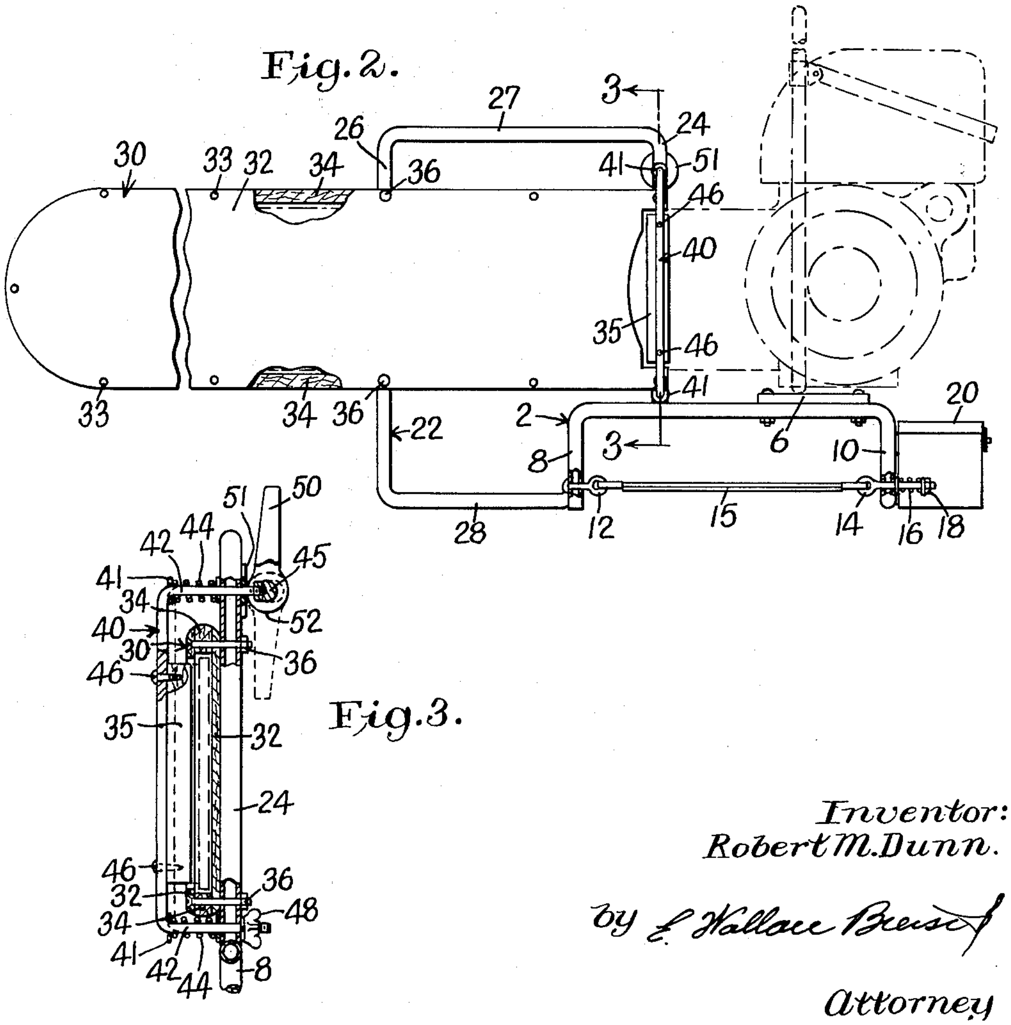
Fig. 2. Fig. 3.
Inventor:
Robert M. Dunn.
by L. Wallace Bruse
Attorney Inventor:
Robert M. Dunn.
by E. Wallace Breisch
Attorney 3,207,395
TRANSPORTING DEVICE
Robert M. Dunn, 2730 Pennsylvania Ave. W. Ext., Warren, Pa.
Filed May 14, 1963, Ser. No. 280,245
9 Claims. (Cl. 224—5)

This invention relates to a transporting device and more particularly to a device for transporting or carrying a power chain saw.

At the present time the power chain saw is considered to be a very essential tool for logging or various farm purposes as is well discussed in U.S. Department of Agriculture Farmers Bulletin No. 2090. In general these power chain saws comprise a gasoline driven engine having an elongated bar extending outwardly therefrom and around the outer periphery of which a cutting chain travels and is driven by the gasoline engine. As can be well testified by those whose have used a power chain saw on uneven or slippery terrain, the carrying of the chain saw becomes quite burdensome and in many instances is a definite hazard since the chain has a plurality of sharp teeth thereon so that when walking it is possible to fall against the saw blade or to drop the saw causing extensive damage to the saw. It is the purpose of this invention to provide a transporting device for such a power saw such that the entire saw can be carried in safety. It is realized that the carrier of this invention has some weight which necessarily adds to the weight to be carried by the individual; however, by the balancing of the weight with the carrier of this invention the net strain of carrying a chain saw is substantially minimized.

Accordingly, one object of this invention is to provide a new and improved manual transporting device for a power chain saw.

Another object of this invention is to provide a new and improved manual transporting device for a power chain saw in which the saw chain is completely enclosed within a sheath and clamped therein so as not to present any sharp edges to the person carrying the saw.

Still another object of this invention is to provide a new and improved manual transporting device for a power chain saw which is convenient to put on, comfortable to wear and is readily adjustable to various sizes of individuals.

Another object of this invention is to provide a new and improved manual transporting device for a power chain saw which is carried on the shoulders of an individual such that it may easily be thrown off in the event of an emergency.

These and other objects of this invention will become more apparent when considered in conjunction with the following description of preferred embodiments of this invention in which:

FIGURE 1 is a top plan view of a power chain saw transporting device constructed in accordance with the principles of this invention with certain portions thereof being broken away to more clearly show the structure thereof;

FIGURE 2 is a side elevational view of a transporting device as shown in FIGURE 1 and in which a power chain saw is shown in phantom;

FIGURE 3 is an enlarged cross sectional view of the portion of the device as shown in FIGURE 2 taken along the line 3—3 thereof;

Figure 4:
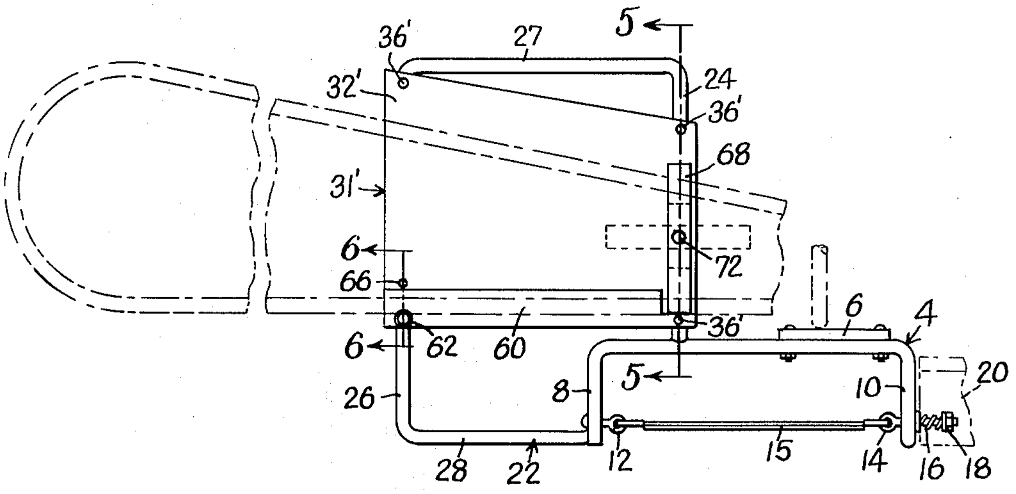
FIGURE 4 is a side elevational view of another form of transporting device constructed in accordance with the principles of this invention.

As shown in FIGURE 1, a transporting device constructed in accordance with the principles of my invention comprises a pair of inverted U-shaped side frame members 2 and 4 having elongated bight portions which are held in rigid parallel relationship by means of a suitable flat cross plate 6 which cross plate 6 is suitably rigidly secured to the rear portion of the bight portions of the frame members 2 and 4. The forward portion of the cross plate 6 is provided with a rearwardly extending arcuate edge 7 so as to provide clearance for the neck of the user of the device as will become more apparent hereinafter. Although the side members 2 and 4 in the cross plate 6 may be of any suitable material, for the purpose of this invention the side members 2 and 4 are preferably formed from aluminum tubing due to the light weight and corrosion resistance thereof. The front and rearward arm portions 8 and 10 of the frame members 2 and 4 are provided with aligned openings adjacent the outer ends thereof through which suitable eye bolts 12 and 14 extend inwardly towards each other, respectively.

Suitable shoulder straps 15 are suitably supported between spaced pairs of eye bolts 12 and 14, respectively. For the purposes of this invention each shoulder strap 15 may be of any suitable structure as is well known in the art and is preferably of a canvas webbing having suitably protected openings in the ends thereof through which the eye portions of the bolts 12 and 14 extend to permit the strap 15 to pivot with respect thereto. It will be noted that the forward bolt 12 is suitably rigidly secured to the forward arm 8 while the rearward bolt 14 extends freely through the rearward arm 10 and rearwardly outwardly therebeyond to permit the rearward eye bolt 14 to be biased rearwardly by means of a suitable spring 16 surrounding the rearward portion of the eye bolt 14 and extending between the rearward portion of the rearward arm 10 and a nut 18 adjustably secured to the eye bolt 14. Such structure permits the tension in the shoulder strap 15 to be adjusted by changing the compression of the spring 16 by means of threadedly adjusting the nut 18 along the outer end of the eye bolt 14.

A suitable elongated tool box 20 is also preferably provided in the structure of this invention; however, it is to be realized that the tool box 20 is not essential to provide a new and improved transporting device. The tool box 20 preferably is suitably rigidly secured, such as by being brazed to the arms 10, to extend laterally between the outward arms 10 and laterally outwardly beyond the arms 10. With such structure the spring 16, the rearward portion of the eye bolt 14 and the nut 18 are located within the tool box 20 so that the adjustment thereof will not be effected as the device is used. The tool box 20 may be of any size and shape as desired and, as shown, comprises a generally rectangular box shaped lower portion having a hinged top portion with a hasp therebetween to provide means for preventing unauthorized access thereto when locked in the usual manner. If desired, any suitable top structure may be employed.

The side member 4 is additionally provided with an upstanding generally rectangular support 22 which is also preferably formed from aluminum tubing. As shown the support 22 has an elongated rearward strut member 24 extending vertically upwardly from an intermediate portion of the bight portion of the side member 4 and a forward elongated strut member 26 spaced forwardly of the arms 8 of the side member 4 and generally parallel to the member 24. Members 24 and 26 are joined by suitably elongated horizontally extending upper and lower connecting members 27 and 28, respectively. It will be realized that the members 24, 26, 27 and 28 are normally formed by bending a single aluminum tube with the lower end of the member 24 being suitably rigidly secured to the bight portion of member 4 in any suitable maner such as by brazing and with the reaward end of the connecting portion 28 being secured to the outer forward surface of the arm 8 of the side member 4 in a similar manner. If desired, the side member 4 and the support 22 can be of a single piece of tubing with the member 24 being secured to the bight portion of the side member 4.

A scabbard or sheath 30 is rigidly secured to the members 24 and 26 and extends forwardly therefrom. The scabbard 30 may be formed from any suitable material, however, for the purposes of this invention it is preferably formed from a soft material compared to the saw teeth such as wood so as not to damage the teeth of the cutting chain. The scabbard 30 is of a length and form as desired to receive the cutter bar and cutting chain of a power chain saw, it being realized that the form of the bar and cutter chain vary with various manufacturers. Although the scabbard 30 is formed in any suitable manner, as shown the scabbard 30 comprises a pair of parallel wooden side plates 32 which are supported laterally apart at their outer edges by means of a wood spacer 34. Side plates 32 and spacer 34 are held together by any suitable means such as wood screws 33 extending through the side plates 32 into the spacer 34.

As shown in FIGURE 3 the scabbard 30 is removably secured to the member 24 by means of a suitable machine screw or bolt 36 extending through the plates 32 and spacer 34 of the scabbard 30 and aligned openings in the member 24 with suitable nuts being threadedly received on the other end thereof. In a similar manner the scabbard 30 is also secured to the member 26. Side plate 32 facing the side member 2 is notched at its rearward end to provide a clearance space for a clamping blade 35 as shown in FIGURE 3. As shown a U-shaped clamping bar 40 extends laterally outwardly of the member 24 from the side facing the side 2 and encompasses the end of the scabbard 30 secured to the member 24. Arm portion 42 of the clamping bar 40 has washers 41 captively located thereon adjacent the bight portion of the clamping bar 40 which washers 41 engage one end of an elongated helical spring 44 surrounding the arm portions 42, respectively. The other end of springs 42 engage other washers 43, respectively, captively located on the arm portions 42. As shown the clamping blade 35 is suitably rigidly secured to the bight portion of the clamping bar 40 to extend inwardly thereof towards the member 24. For the purposes of this invention the clamping blade 35 is preferably made of wood so as not to damage the bar of a power saw and to permit wood screws 46 to be used to secure the blade 35 to the bight portion of the bar 40.

Member 24 is provided with longitudinally spaced clearance openings through which the free ends of the arm portions 42 of the clamping bar 40 freely extend. The free end of the lower arm 42 is threaded to receive a wing nut 48, while the outer end of the upper arm 42 is threaded and received within a stem portion of a T-shaped member 45. A generally U-shaped cross section elongated cam lever 50 has the outer ends of the arms thereof pivotally secured by means of pivot pins 47 to the ends of the cross portion of the T-shaped member 45 so that the cam lever 50 is manipulatable to move the clamping blade 35 into and out of engagement with the bar of a power saw. As shown a washer 51 is interposed between the lever 50 and the member 24 to provide a bearing surface for the lever 50. In order to move the blade 35 the outer ends of each arm of the lever 50 are provided with an arcuate cam surface 52 engaging the washer 51 so that as the cam lever 50 is moved upwardly the movement of the cam surface 52 over the washer 51 moves the clamping blade 35 away from the member 24 and releases the upper spring 44. As the cam lever 50 is moved downwardly to the lowermost position shown in outline in FIGURE 3, the reverse movement occurs and the clamping blade 35 is moved toward the member 24. It will be appreciated that the cam surfaces 52 on the cam lever 50 can be arranged to give the operation as desired with either upward or downward movement of the lever 50.

In use the cam lever 50 is rotated about the pivot pins 47 to extend vertically upwardly to move the clamping blade 35 away from the scabbard 30. The cutting bar with cutting chain thereon of a power chain saw is then inserted between the side plates 32 of the scabbard 30 until the base of the rearward portion thereof is upwardly adjacent the cross plate 6. The rearward portion of a chain saw is the gasoline driving engine and includes an integral carrying handle portion so that the power saw may be easily so inserted. The engine portion of the saw is then lowered to rest on the plate 6. Thereafter the cam lever 50 is rotated downwardly to move the clamping blade 35 into engagement with the surface of the power saw blade facing the bar 35. By proper adjustment of the wing nut 48 on the threaded end of the lower arm 42 and the member 45 on the upper arm 42 the compression on the springs 44 can be varied so that the in and out movement of the blade 35 can be varied. Also such adjustment permits the clamping force of the blade 35 on the saw bar to be varied. It will be realized that the blade 35 forces the saw bar into engagement with the adjacent surface of the side plate 32 immediate adjacent the members 24 and 26.

Once the power chain saw and the carrier of this invention are so secured together the combined carrier and saw may be lifted as a unit either by the integral handle of the saw or the member 27 to elevate the combined unit above and over the person who is to carry the combined unit.

The carrying individual's neck is located forwardly of the plate 6 and the straps 15 extend laterally over the shoulders of the carrying individual, respectively. The right hand of the carrying individual may then grasp the member 28 to balance the load of the combined unit on his shoulders. It will be obvious that once the combined unit is carried to the desired location the reverse procedure is employed to remove the power saw.

From the foregoing it will be noted that I have provided an inexpensive, compact, light weight saw carrier which can be adapted, in principle, to any make of power saw. In addition such a carrier is ideally suited for securing a power chain saw for automobile or truck transport in a safe manner. Regardless of how transported, the power chain saw is upright so that there is a minimum of danger from oil and gas dripping.

Figure 5:
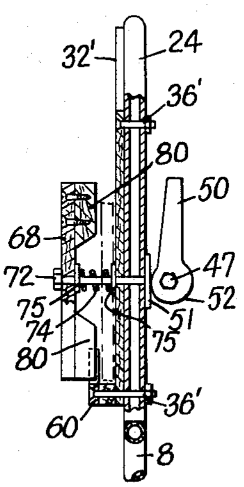
FIGURE 5 is an enlarged cross sectional view of the device as shown in FIGURE 4 taken along the lines 5—5 thereof.
Figure 6:
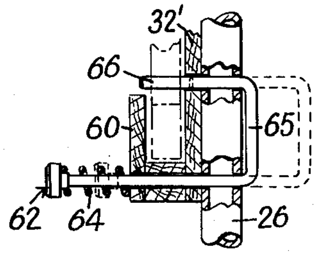
FIGURE 6 is a still further enlarged cross sectional view of the device shown in FIGURE 4 taken along the lines 6—6 thereof.

FIGS. 4 to 6 illustrate another embodiment of my invention in which like parts have been identified by the same reference numerals. The embodiment differs from the prior embodiment described in that a scabbard 30' is provided to receive the bar of a plunge bow power chain saw. Such a plunge bow bar is shown in phantom in FIG. 4 and comprises a loop bar over which the cutter chain travels. In this embodiment a plate 32' is secured to the members 24 and 26, in any suitable manner such as machine screws or bolts 36' in the manner the scabbard 30 was secured, such that plate 32' extends slightly forwardly of member 26, slightly rearwardly of member 24, and across the members 24 and 26. An L-shaped bar retainer 60 is rigidly secured to the plate 32' and as shown an assembly 36 as before indicated is employed to secure the bar retainer 60 to the plate 32' and member 24. Plate 32' and retainer 60 are made of wood for the reasons heretofore indicated with reference to scabbard 30. As shown the retainer 60 provides in cooperation with the plate 32' a channel for receiving the lower portion of the bar of a plunge bow.

The forward end of the carrier is provided with a spring biased retainer 62 which, as shown in FIG. 6, comprises a headed rod 62 having a spring 64 captively received thereon. Rod 62 passes through aligned clearance openings in the bar retainer 60, plate 32' and member 26 with the headed end being located outwardly of the bar retainer 60 and with the spring 64 extending between and engaging the headed end of retainer 62 and the outer surface of the retainer 60. Retainer 62 has an upwardly extending portion 65 on the side of member 26 remote from the spring 64. Member 26 and plate 32' are provided with outer clearance openings upwardly of the first mentioned clearance openings therein through which extends a reversedly bent portion 66 of retainer 62 extending from the upper end of the portion 65. Portion 66 of retainer 62 is of a length so that when the spring 64 is in its normal position the portion 66 is located upwardly adjacent the free end of the upper end of the retainer 60. In use the retainer 62 is moved toward the member 26 compressing the spring 64 and moving the portion 66 toward the member 26 to clear the saw bar receiving channel. After the saw bar is located in the channel the retainer 60 is released and the spring 64 moves the retainer 60 so that the portion 66 captively retains the saw bar in the channel.

FIG. 5 illustrates a pivoting clamping structure employed to clamp the bars of a plunge bow saw to the plate 32' adjacent the member 24. As shown, the rearward end of the retainer 60 is notched to provide clearance for a clamping blade 68 when such blade 68 is located vertically as hereinafter described. Clamping blade 68 is preferably made of wood for the reasons heretofore indicated and comprises an elongated member outwardly adjacent the plate 32'. Clamping blade 68 is provided with a central opening through which a suitable elongated pivot shaft 72 extends and which pivot shaft 72 also extends through a clearance opening in the member 24. A suitable helical spring 74 is located on the pivot shaft 72 intermediate the plate 32' and the blade 68. If desired, each end of spring 74 may engage suitable washers 75. The free end of the pivot shaft 72 is threadedly received within a T-shaped member 45 (not shown in this embodiment) to which is secured a cam lever 50 by pivot pins 47 as heretofore described. A washer 51 as heretofore described is also provided to engage the cam surfaces 52 of the cam lever 50.

In use the blade 68 is rotated to extend between the bar portions of a plunge bow power saw so that such bars can be located on either side of the pivot shaft 72 with the lower portion of the bar being located in the retainer 60. The blade 68 is rotated to extend vertically so that the pads 80 thereof are outwardly adjacent both the upper and lower portions of the saw bar. Thereafter cam lever 50 is actuated as heretofore described to clamp the saw bar to the plate 32'.

Having described preferred embodiments of this invention in accordance with the patent statutes, it is to be realized that other modifications thereof may be made without departing from the broad spirit and scope of this invention. Accordingly, it is respectfully requested that this invention be interpreted as broadly as possible and as limited only by the prior art.

I claim:

1. A transporting device for a chain saw comprising an elongated base, elongated frame members rigidly secured to opposite ends of said base respectively and extending outwardly therefrom in one direction, each of said frame members having longitudinally spaced portions extending laterally outwardly therefrom and outwardly from said base, flexible support means extending between longitudinally opposed ones of said longitudinally spaced portions, respectively, one of said frame members having means for receiving a cutter bar rigidly secured thereto, said cutter bar receiving means being spaced in said one direction from said base and extending in said one direction, and means carried by said one frame member for holding such a cutter bar with respect to said cutter bar receiving means.

2. A transporting device as defined in claim 1 in which a tool box is rigidly secured to said frame members.

3. A transporting device for a chain saw comprising, a frame member, an elongated cutter bar receiving member rigidly secured to said frame member, an elongated base rigidly secured to said frame member to extend laterally of said receiving member at one end thereof, flexible supporting means carried by said base at the ends thereof, respectively, said flexible supporting means and said receiving member being located on opposite sides of said base, and means carried by one of said members for holding such a cutter bar with respect to said receiving member.

4. A transporting device as defined in claim 3 in which additional holding means are provided spaced longitudinally with respect to said receiving member from said first mentioned holding means.

5. A transporting device as defined in claim 3 in which said receiving means comprises a hollow open end sheath.

6. A transporting device as defined in claim 3 in which an elongated tool box is rigidly secured to said frame member and extends adjacent the portion of said base remote from said receiving member.

7. A transporting device as defined in claim 6 in which adjusting means are located in said tool box for adjusting the flexibility of said supporting means.

8. A transporting device as defined in claim 3 in which said receiving member comprises a hollow open ended sheath.

9. A transporting device as defined in claim 3 in which said receiving member includes a U-shaped trough for receiving a portion of a bow saw cutter bar.

References Cited by the Examiner

UNITED STATES PATENTS

| | | | |
|---|---|---|---|
| 2,826,294 | 3/58 | Nicodemus | 143—32 |
| 3,042,087 | 7/62 | Otoupalik | 143—32 |

HUGO O. SCHULZ, *Primary Examiner.*

MORRIS TEMIN, *Examiner.*